United States Patent

Shouji et al.

[11] Patent Number: 6,061,897
[45] Date of Patent: May 16, 2000

[54] FABRICATION OF RAIL OF MAGNETIC HEAD SLIDER

[75] Inventors: Shigeru Shouji; Masahiro Sugiura, both of Hamamatsu, Japan

[73] Assignee: Yamaha Corporation, Japan

[21] Appl. No.: 09/097,373

[22] Filed: Jun. 15, 1998

[30] Foreign Application Priority Data

Jun. 18, 1997 [JP] Japan .................................. 9-177765

[51] Int. Cl.[7] .............................. G11B 5/127; C23F 1/00
[52] U.S. Cl. ................................ 29/603.12; 29/603.16; 29/603.18; 216/47; 216/66
[58] Field of Search ........................... 29/603.07, 603.12, 29/603.16, 603.18; 216/47, 66

[56] References Cited

U.S. PATENT DOCUMENTS

| | | | |
|---|---|---|---|
| 4,360,585 | 11/1982 | Frank et al. ............................. | 430/312 |
| 4,576,678 | 3/1986 | Shibata .................................... | 156/643 |
| 4,582,566 | 4/1986 | Grey ........................................ | 156/651 |
| 5,131,978 | 7/1992 | O'Neill .................................... | 156/653 |
| 5,138,508 | 8/1992 | Matsuzawa et al. ..................... | 360/121 |
| 5,210,666 | 5/1993 | Chapin et al. ........................... | 360/103 |
| 5,329,689 | 7/1994 | Azuma et al. ............................ | 29/603 |
| 5,345,353 | 9/1994 | Krantz et al. ............................ | 360/103 |
| 5,349,745 | 9/1994 | Kawabe et al. .......................... | 29/603 |
| 5,424,888 | 6/1995 | Hendriks et al. ........................ | 360/103 |
| 5,515,219 | 5/1996 | Ihrke et al. .............................. | 360/103 |
| 5,566,075 | 10/1996 | Syouji et al. ............................ | 364/468.24 |
| 5,640,755 | 6/1997 | Kubota et al. ........................... | 29/603.16 |
| 5,657,192 | 8/1997 | Cohen et al. ............................. | 360/126 |
| 5,722,157 | 3/1998 | Shouji et al. ............................ | 29/603.14 |
| 5,734,536 | 3/1998 | Shouji et al. ............................ | 360/126 |

Primary Examiner—David P. Bryant
Assistant Examiner—Essama Omgba
Attorney, Agent, or Firm—Ostrolenk, Faber, Gerb & Soffen, LLP

[57] ABSTRACT

A first resist mask is formed on a rail, covering an area where none of a shallow surface and a deep surface are formed. A first etching process is performed to etch the rail not covered with the first resist mask to a depth corresponding to the shallow surface. Next, without removing the first resist mask, a second resist mask is formed covering an area where the shallow surface is formed. A second etching process is performed to etch the rail not covered with the first and second resist masks, to a depth corresponding to the deep surface. After the first and second etching processes, the first and second resist masks are removed from the rail.

14 Claims, 9 Drawing Sheets

FABRICATION OF RAIL OF MAGNETIC HEAD SLIDER

This application is based on Japanese patent application No. HEI-9-177765 filed on Jun. 18, 1997, the entire contents of which are incorporated herein by reference.

BACKGROUND OF THE INVENTION a) Field of the Invention

The present invention relates to a method of fabricating the rail of a magnetic head capable of improving work precision and production yield, in which the rail surface is etched and/or milled to depths of at least two steps.

b) Description of the Related Art

Figure 2:
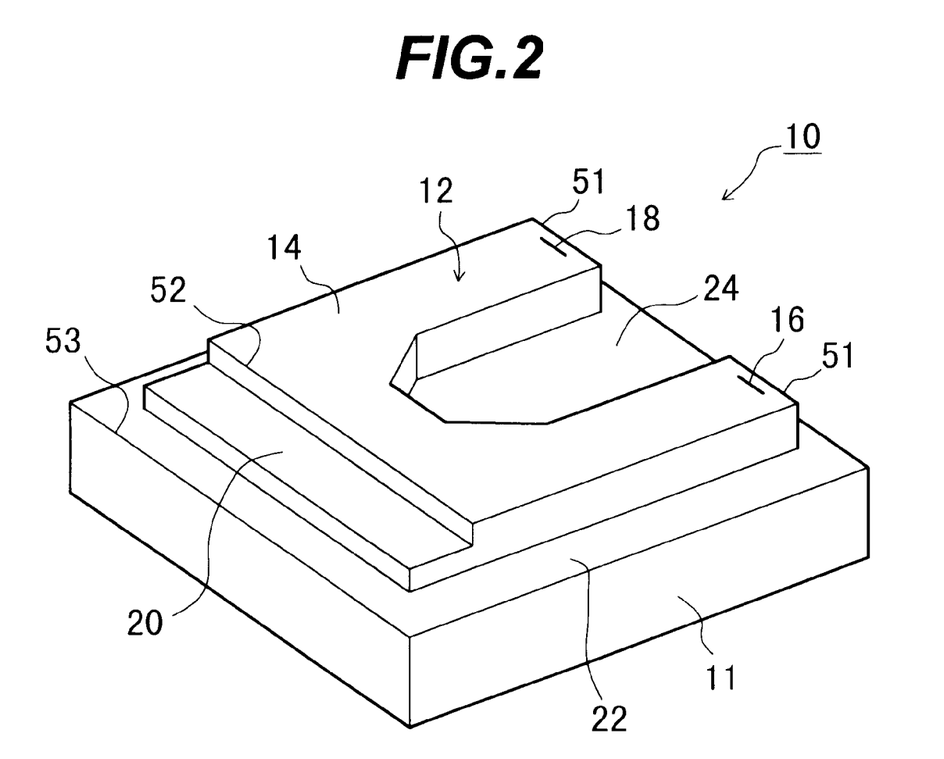
FIG. 2 is a perspective view of a negative pressure slider as viewed from the rail side, the slider being formed by the embodiment method.

A flying type magnetic head of a hard disk drive has, for example, the structure shown in FIG. 2. This magnetic head 10 has a negative pressure slider 11 whose top surface 14 is etched and/or ion-milled to two depth. A rail surface 12 includes the top surface 14 of generally a channel shape. Thin film magnetic heads (transducers) 16 and 18 are embedded in the rail near at a trailing edge 51, with their pole facets being exposed. The rail surface 12 includes, in addition to the top surface 14, the shallow surface 20 and deep surface 22 at two-step depths milled down from the top surface 14. The shallow surface 20 extends from a leading edge 52 of the rail and milled to form a shallow step. The deep surface 22 constitutes the outer peripheral region of the rail and a negative pressure generating recess 24 surrounded by the rail having the top surface 14 of the channel shape, and is milled deeper than the shallow surface 20.

Upon rotation of a hard disk, air flowed from the leading edge 53 of the magnetic head 10 generates a positive pressure while passing along the shallow surface 20 and deep surface 22, and a negative pressure while passing along the negative pressure generating recess 24. The shallow surface 20, deep surface 22 and top surface 14 provide the function same as the taper surface of a magnetic head. The slider 11 maintains a constant flying height under a balanced condition of the positive and negative pressures.

SUMMARY OF THE INVENTION

It is an object of the present invention to provide a method of fabricating the rail of a magnetic head capable of improving work precision and production yield, in which the rail surface is etched and/or milled to two-step depths.

According to one aspect of the present invention, there is provided a method of manufacturing a slider having a rail, comprising the steps of: a) providing a first mask pattern on a substrate having a primary surface of a first level; b) etching the substrate through the first mask pattern to form a second level on the primary surface; c) providing a second mask pattern on the substrate in such a manner that a part of the second mask pattern overlaps a part of the remaining first mask pattern to form a third mask pattern; and d) etching the substrate through the third mask pattern to form a third level on the primary surface.

According to another aspect of the present invention, there is provided a method of fabricating a magnetic head slider with a rail having at least two-step depths including a shallow surface etched to a shallow depth and a deep surface etched to a deep depth, the method comprising the steps of: fixing the slider on a work base, a flat top surface of the rail being directed upward; covering with a first resist mask an area of the rail sop surface where none of the shallow and deep surfaces are formed; etching an area not covered with the first resist mask to the shallow depth, leaving the first resist mask and covering with a second resist mask an area were the shallow surface is formed; etching an area not covered with the first and second resist masks to the deep depth; after the first and second etching steps, and removing the first and second resist masks from the rail and dismounting the slider from the work base, wherein the first resist mask has a sufficient thickness not removed by the first and second etching steps and the second resist mask has a sufficient thickness not removed by the second etching step.

As above, the first etching step forms the shallow surface and an intermediate surface of the deep surface, and the second etching step forms the deep surface.

DETAILED DESCRIPTION OF THE PREFERRED EMBODIMENTS

A rail 12 having a pattern shown in FIG. 2 is difficult to be formed by mechanical trenching work with a machine tool. Therefore, it is usually formed by etching and/or ion-milling.

An example of a novel method of milling the rail 12 shown in FIG. 2 is illustrated in FIGS. 3A and 3B and FIGS. 8A to 8C. The processes of this method will be described.

Figure 3A:
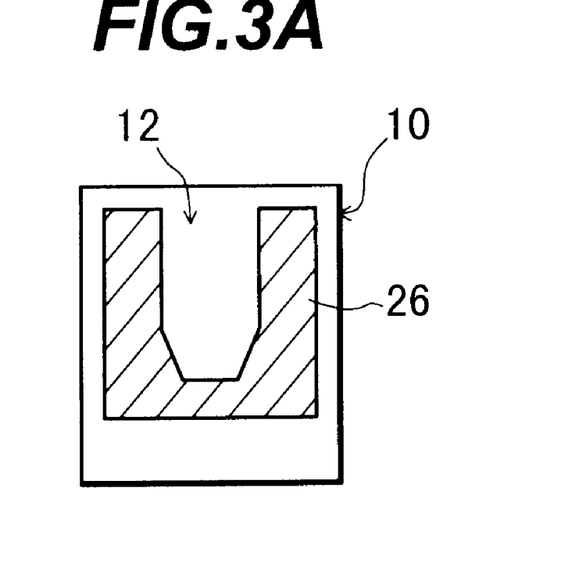
FIGS. 3A and 3B are plan views of a magnetic head illustrating one method of fabricating the rail shown in FIG. 2.
Figure 3B:
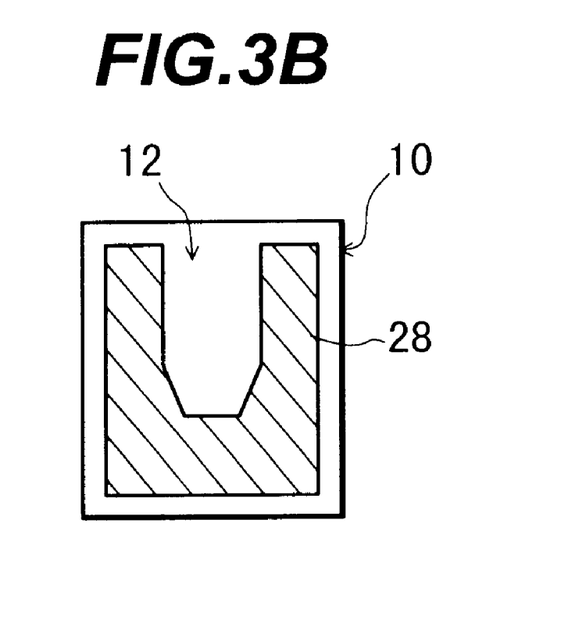
Figure 8A:
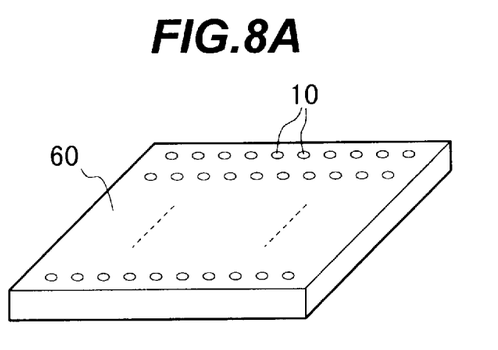
FIGS. 8A to 8C are perspective views of a wafer illustrating some processes of the rail fabricating method.
Figure 8B:
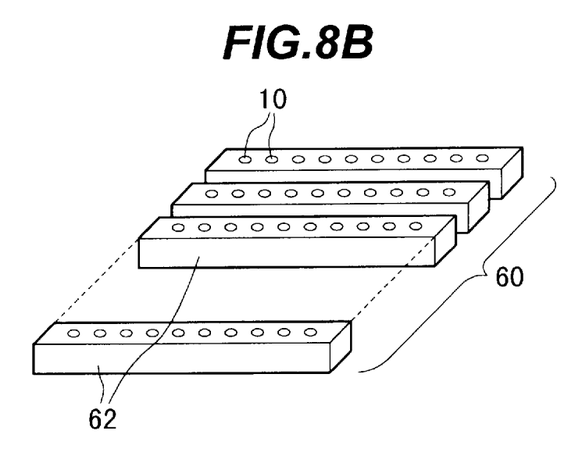
Figure 8C:
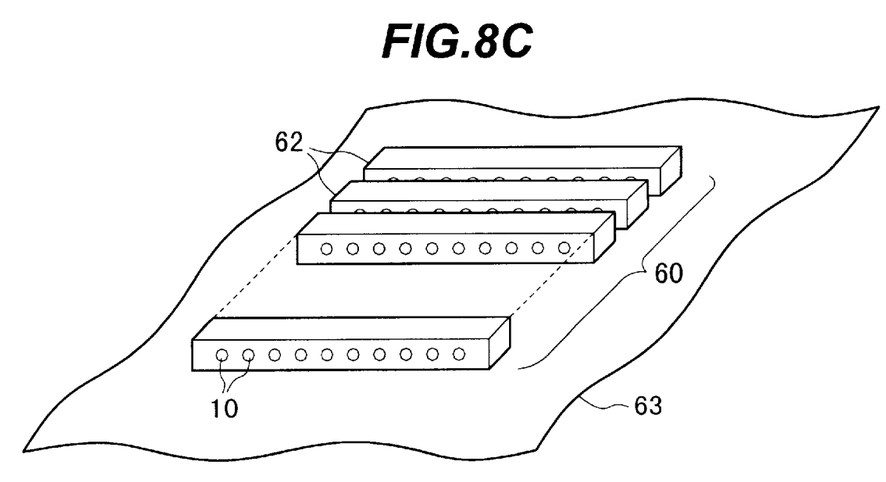

(1) As shown in FIG. 8A, a number of thin film magnetic heads 10 are formed along vertical and horizontal directions on a wafer 60 of ceramics such as $Al_2O_3$—TiC. For the general background of a method of manufacturing a thin film magnetic head, refer to U.S. Pat. No. 5,734,536 or U.S. Pat. No. 5,722,157 which are herein incorporated by reference. Next, as shown in FIG. 8B, the wafer 60 mounted with the thin film magnetic heads 10 is severed along one direction to form a number of rows 62. Then, as shown in FIG. 8C, a number of rows 62 are placed side by side on a work base (work substrate) 63 and fixed thereto with adhesive. Each row 62 has a number of magnetic heads 10 laterally disposed in line. FIGS. 3A and 3B show one magnetic head 10 on the row 62. At this stage, the rail 12 shown in FIG. 3A has a flat surface.

(2) As shown in FIG. 3A, resist is coated on the surface of the rail 12 and exposed and developed to form a resist mask 26 covering the top surface 14. The thickness of the resist mask 26 is set to about 10 µm, by considering film thinning to be caused at the next process (3).

(3) Ion are incident on the surface of the rail 12 to etch (dry-etch) and/or ion-mill the rail 12 not covered with the resist mask 26, e.g., by about 0.5 µm in depth from the top surface 14 to form a shallow surface 20. Ion milling may be performed by applying Ar ions to the rail 12. Ar pressure is $6\times10^{-6}$ Torr. For the general background of ion milling, for example, refer to U.S. Pat. No. 5,734,536 which is herein incorporated by reference. Etching may be performed by reactive ion etching with $Cl_2$ or $CF_4$ gas.

(4) The row 62 with the work base 63 is immersed in solvent to remove the resist mask 26. In this case, since the adhesive used for fixing the row 62 to the work base 63 is also dissolved with the solvent, the row 62 is also dismounted from the work base 63.

For example, the remover for removing the resist mask is NMP (N-methyl-2-pyrrolidone), and the adhesive is conductive tape (Sumitomo 3M Ltd:X7001) or polyimide varnish (Nissan Chemical Industries, Ltd.: Sunever SE-803, or Toshiba Chemical Corporation: Kemitite CT4112).

The adhesive should satisfy the following conditions.

(1) Heat-resistant property and heat-conductive property for ion milling:

The adhesive should endure the raised temperature and transfer heat to prevent excessive temperature rise during ion milling process.

(2) Removal property of the row 62.

The rows should be removed from the work base without leaving contamination.

The remover for removing the resist mask should not involve acid or alkali which corrodes NiFe alloy used in a pole or solve a substance of a slider of the magnetic head.

Combination of the adhesive and the remover is thus limited. It is difficult to use an adhesive which is not solved by the remover of the resist mask.

(5) The rows 62 are again placed side by side on a work base 63 and fixed thereto with adhesive.

(6) As shown in FIG. 3B, resist is coated on the rail 12 and exposed and developed to form a resist mask 28 covering the top surface 14 and shallow surface 20. The thickness of the resist mask 28 is set to about 30 µm, by considering film thinning to be caused at the next process (7).

(7) Ion are incident on the surface of the rail 12 to etch (dry-etch) and/or ion-mill the rail 12 not covered with the resist mask 28, e.g., by about 2.0 µm to 2.5 µm in depth from the shallow surface 14 to form a deep surface 22.

(8) The row 62 with the work base 63 is immersed in solvent to remove the resist mask 28. In this case, since the adhesive used for fixing the row 62 to the work base 63 is also dissolved with the solvent, the row 62 is also dismounted from the work base 63. With the above processes, the rail 12 of the magnetic head shown in FIG. 2 is completed.

Figure 4:
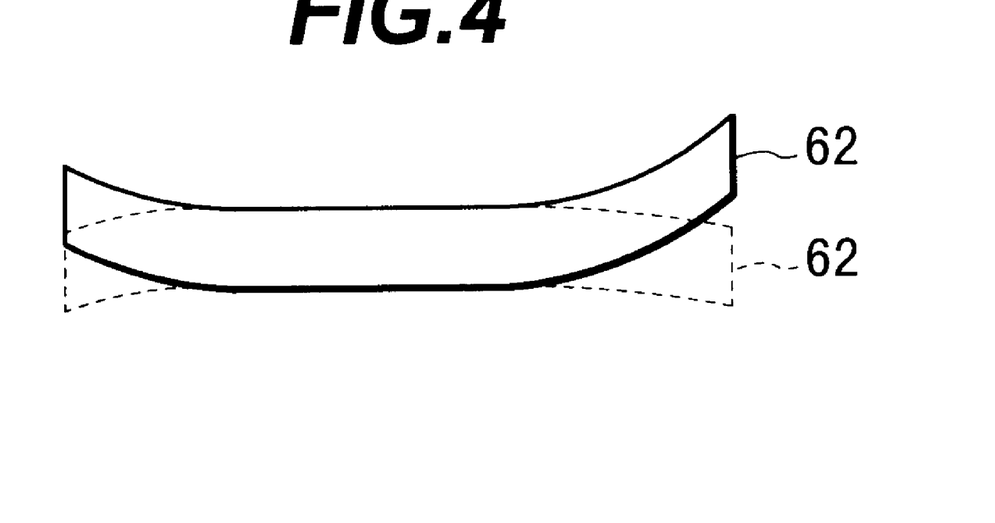
FIG. 4 is a plan view of rows having different shapes at the rail fabricating processes shown in FIGS. 3A and 3B.
Figure 5:
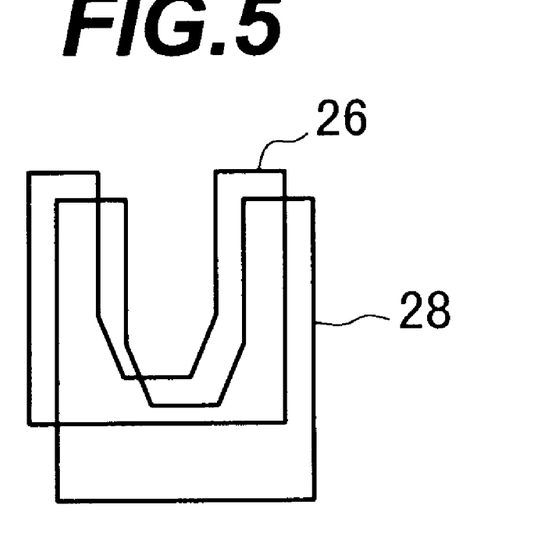
FIG. 5 is a plan view of resist masks misaligned at the rail fabricating processes shown in FIGS. 3A and 3B.

With the method illustrated in FIGS. 3A and 3B, the row 62 has some warp when it is disposed on the work base at the processes (1) and (5), as shown in the plan view of FIG. 4. This warp results from techniques of a worker who dispose the rows on the work base, and has not reproductivity. The rows 62 may be disposed with different warp shapes at the processes (1) and (5). For example, at the process (1) the ends of the row 62 are bent upward as viewed in FIG. 4, whereas at the process (5) the ends of the row 62 are bent downward. It is impossible for an exposure system to expose a resist mask pattern perfectly conformal to the warp of the row 62. Therefore, if the rows are disposed with different warped shapes, the exposure and development processes at (2) and (6) form the resist masks 26 and 28 which are misaligned as shown in FIG. 5. For example, the resist mask 26 formed at the process (2) is displaced upper left from the resist mask 28 formed at the process (6). The shape of the rail etched and/or milled by using these resist masks 26 and 28 becomes considerably different from the designed shape, so that the expected hovering performance cannot be achieved.

FIGS. 1A to 1D illustrates a method of fabricating a rail 12 (full-etched ABS) of a magnetic head 10 shown in FIG. 2, according to an embodiment of the invention. Each process of this method will be described.

(1) As shown in FIG. 8A, a number of thin film magnetic heads 10 are formed along vertical and horizontal directions on a wafer 60 of ceramics such as $Al_2O_3$—TiC. Next, as shown in FIG. 8B, the wafer 60 mounted with the thin film magnetic heads 10 is severed along one direction to form a number of rows 62. Then, as shown in FIG. 8C, a number of rows 62 are placed side by side on a work base (work substrate) 63 and fixed thereto with adhesive. Each row 62 has a number of magnetic heads 10 laterally disposed in line. At this stage, the rail 12 shown in FIG. 3A has a flat surface. FIGS. 1A to 1D are plan views showing one magnetic head 10 on the row 62.

Figure 1A:
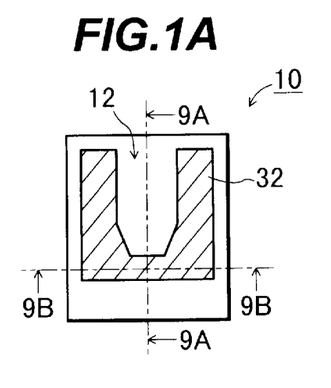
FIGS. 1A to 1D are plan views of a magnetic head illustrating the processes of forming a rail shown in FIG. 2, according to an embodiment of the present invention.
Figure 9A:
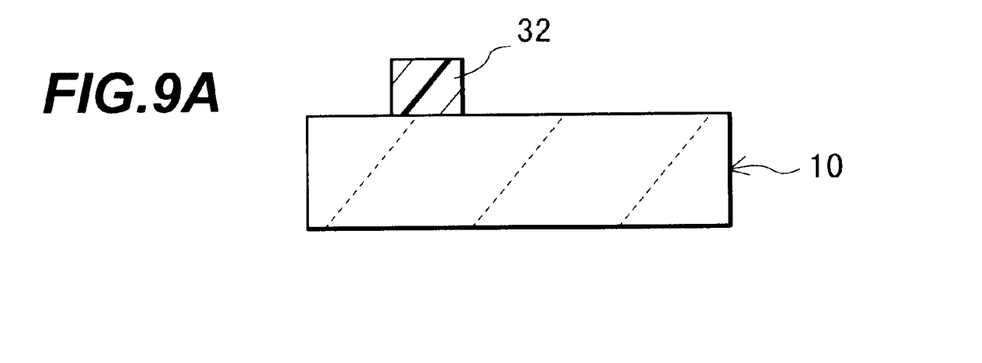
FIGS. 9A and 9B are cross sectional views of the magnetic head shown in FIG. 1A.
Figure 9B:
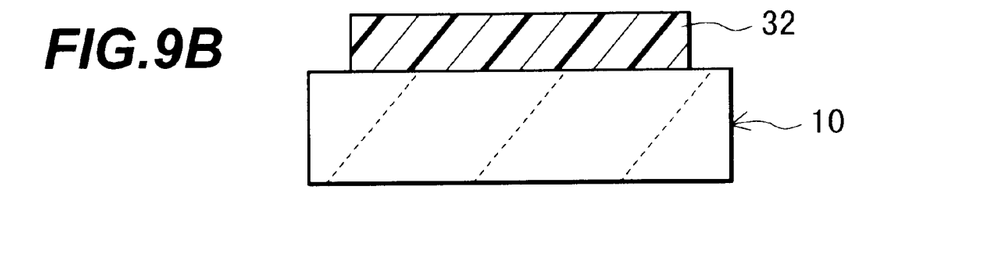

(2) As shown in FIG. 1A, resist is coated on the surface of the rail 12 (or a resist film is adhered to the surface of the rail) and exposed and developed to form a resist mask (indicated by hatching lines) 32 covering the top surface 14. FIG. 9A is a cross sectional view taken along line 9A—9A in FIG. 1A, and FIG. 9B is a cross sectional view taken along line 9B—9B in FIG. 1A. The thickness of the resist mask 32 is set to a sufficient value (e.g., about 50 µm) not to be removed (not to expose the top surface 14) at two etching processes (processes (3) and (5) to be later described).

Figure 1B:
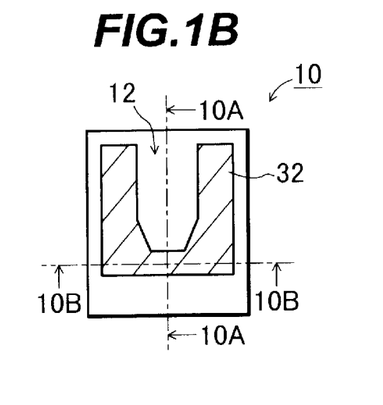
Figure 10A:
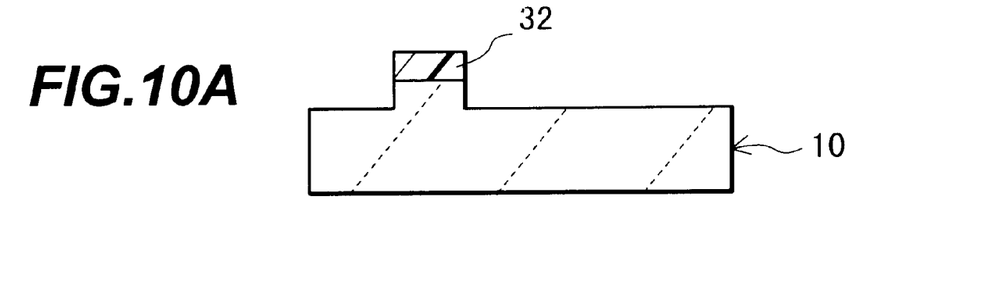
FIGS. 10A and 10B are cross sectional views of the magnetic head shown in FIG. 1B.
Figure 10B:
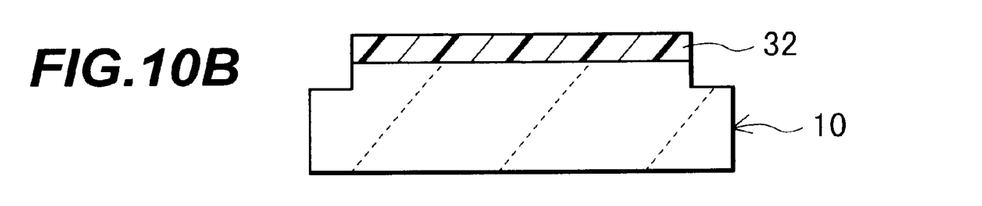

(3) As shown in FIG. 1B, ion beams are applied to the surface of the rail 12 to etch (dry-etch) and/or ion-mill the rail 12 not covered with the resist mask 26, e.g., by about 0.5 µm in depth from the top surface 14 to form a shallow surface 20. FIG. 10A is a cross sectional view taken along line 10A—10A in FIG. 1B, and FIG. 10B is a cross sectional view taken along line 10B—10B in FIG. 1B. At this stage, the resist mask 32 is left and the row 62 is not dismounted from the work base 63.

Figure 1C:
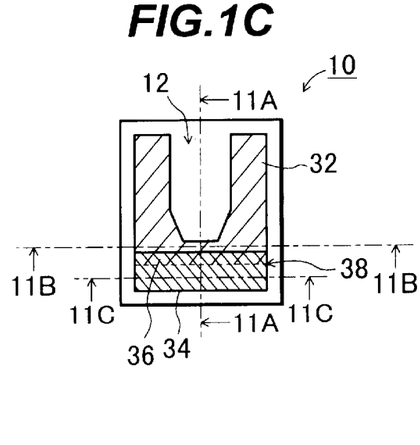
Figure 11A:
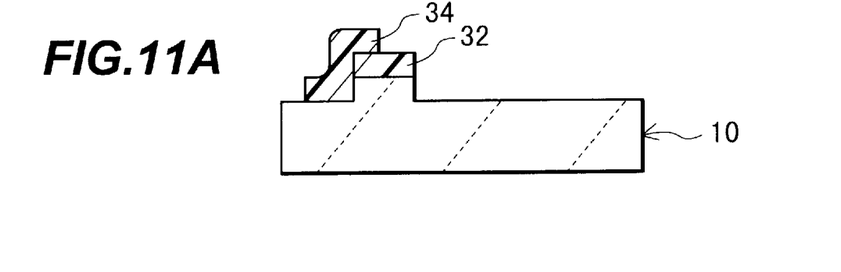
FIGS. 11A to 11C are cross sectional views of the magnetic head shown in FIG. 1C.
Figure 11B:
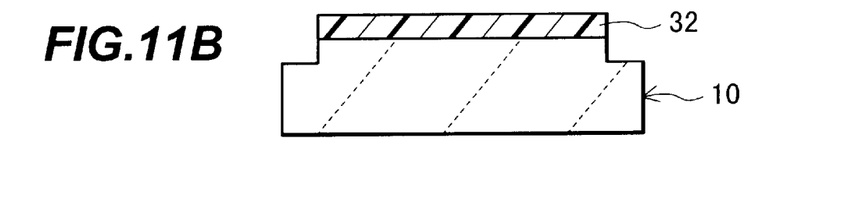
Figure 11C:
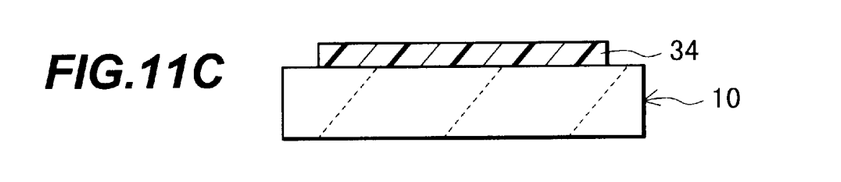

(4) As shown in FIG. 1C, resist is coated on the surface of the rail 12 (or a resist film is adhered to the surface of the rail) and exposed and developed to form a resist mask (indicated by hatching lines) 34 covering a shallow surface 20. FIG. 11A is a cross sectional view taken along line 11A—11A in FIG. 1C, FIG. 11B is a cross sectional view taken along line 11B—11B in FIG. 1C, and FIG. 11C is a cross sectional view taken along line 11C—11C in FIG. 1C. A trailing edge portion of the resist mask 34 overlaps an air inflow end portion 36 of the left resist mask 32 by a predetermined small width to form an overlap portion 36 of the resist masks 32 and 34. This overlap portion 36 prevents any gap at an boundary area 38 between the resist masks 32 and 34 from being formed by an position alignment error of the resist masks formed by photolithography. The thickness of the resist mask 34 is set to a sufficient value (e.g., about 30 μm) not to be removed at the next etching process (5). As above, the resist masks 32 and 34 are formed on the row 62 without dismounting it from the work base 63. Therefore, any explicit warp of the row 62 is not formed and the resist mask misalignment can be suppressed.

Figure 1D:
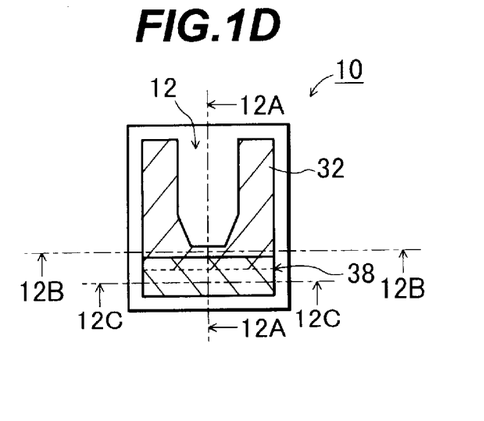
Figure 12A:
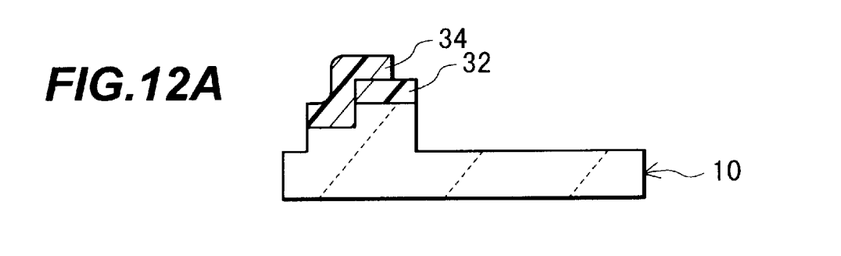
FIGS. 12A to 12C are cross sectional views of the magnetic head shown in FIG. 1D.
Figure 12B:
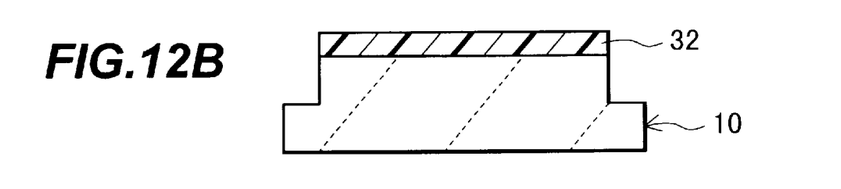
Figure 12C:
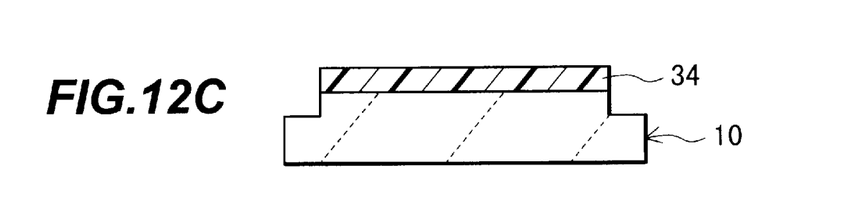

(5) As shown in FIG. 1D, ions are incident on the surface of the rail 12 to etch (dry-etch) and/or ion-mill the rail 12 not covered with the resist masks 32 and 34, e.g., by about 2.0 μm in depth from the shallow surface 20 and 2.5 μm from the top surface 14 to form a deep surface 22. FIG. 12A is a cross sectional view taken along line 12A—12A in FIG. 1D, FIG. 12B is a cross sectional view taken along line 12B—12B in FIG. 1D, and FIG. 12C is a cross sectional view taken along line 12C—12C of FIG. 1D.

(6) The row 62 with the work base 63 is immersed in solvent to remove the resist masks 32 and 34. In this case, since the adhesive used for fixing the row 62 to the work base 63 is also dissolved with the solvent, the row 62 is also dismounted from the work base 63. With the above processes, the rail 12 of the magnetic head 10 shown in FIG. 2 is completed. By severing the row 62, each separated magnetic head 10 with a slider is formed.

The advantages of the method illustrated in FIGS. 1A to 1D over the method illustrated in FIGS. 3A and 3B will be described.

(A) Advantages of omitting a second row adhesion process.

Figure 6A:
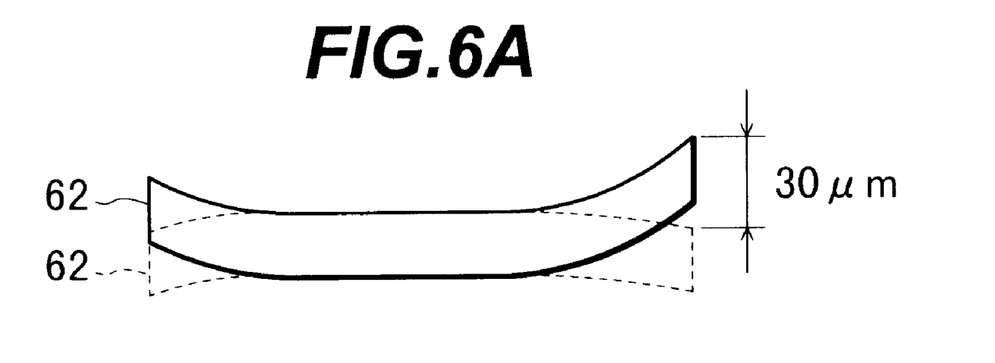
FIGS. 6A and 6B are plan views of rows having different shaped and a plan view of resist masks misaligned, respectively at the rail fabricating processes illustrated in FIGS. 3A and 3B.
Figure 6B:
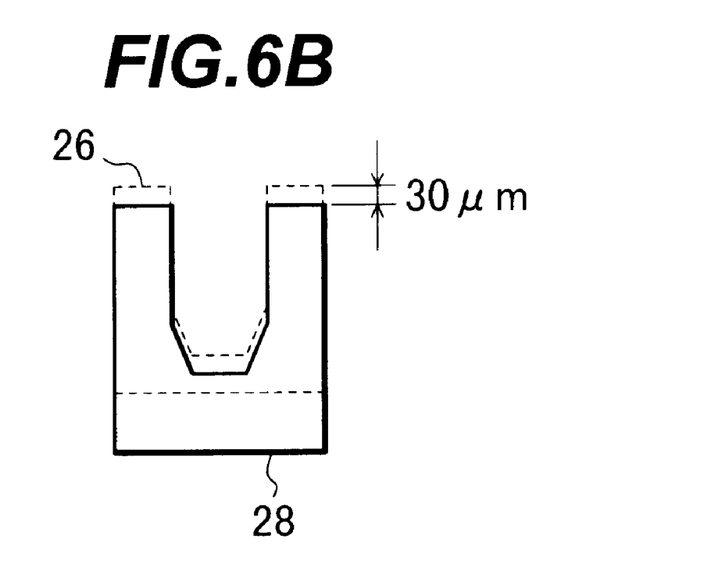

A second row adhesion process through the processes (4) and (5) shown in FIGS. 3A and 3B changes the shape of the row 62 at a maximum of about 30 μm along the direction of the surface of the work base, as shown in FIG. 6A. Therefore, as shown in FIG. 6B, a position misalignment of the resist masks 26 and 28 has a maximum of about 30 μm along the direction of the surface of the work base.

In contrast with this, the method illustrated in FIGS. 1A to 1D does not perform the second row adhesion process. Therefore, the shape of the row 62 is maintained unchanged throughout all the rail fabricating processes, and the position alignment precision of the resist masks formed at the processed (2) and (4) can be improved.

(B) Advantages of not removing resist masks.

Figure 7A:
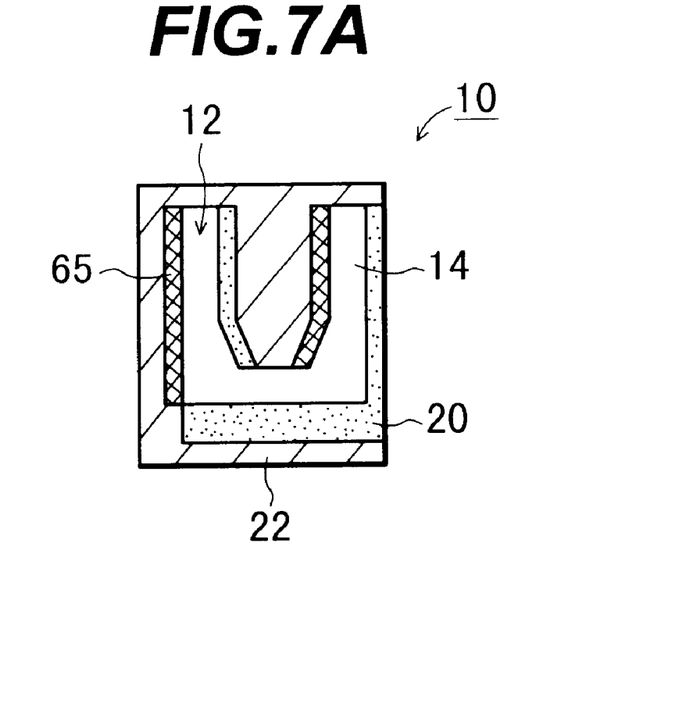
FIG. 7A is a plan view of the magnetic head showing the rail surfaces fabricated by the method illustrated in FIGS. 3A and 3B.

With the method illustrated in FIGS. 3A and 3B, the resist mask 26 once formed is removed and the row 62 is again fixed to another word base 63. Thereafter, the resist mask 28 is formed overlapping the area where the resist mask 26 was formed. However, a position misalignment may occur during the two resist mask forming processes. The final pattern of the rail 12 of the magnetic head 10 has a position misalignment in the wide area as shown in FIG. 7A, and the flying performance changes greatly. In FIG. 7A, the top surface 14 is shown without hatching lines, the shallow surface (0.5 μm in depth) 20 is shown by dots, and the deep surface (2.5 μm in depth) 22 is shown by hatched lines. An unintended intermediate surface (2.0 μm in depth) 65 is formed which is shown by crossed lines.

Figure 7B:
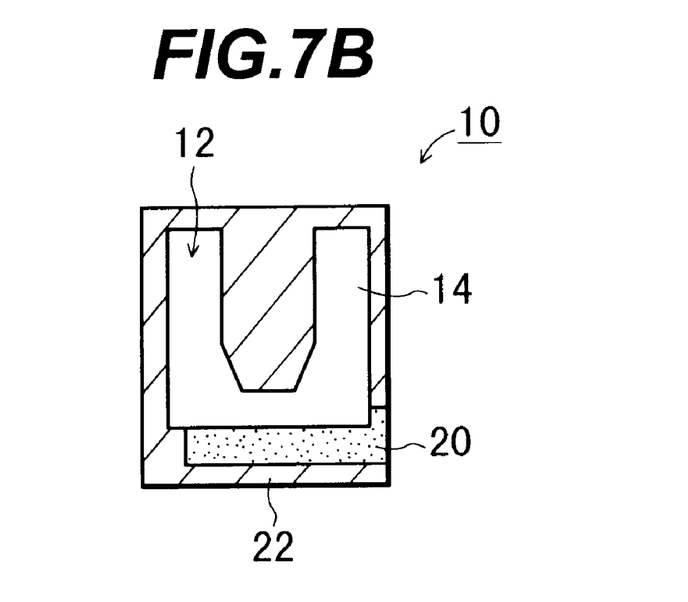
FIG. 7B is a plan view of the magnetic head showing the rail surfaces fabricated by the method illustrated in FIGS. 1A and 1B.

In contrast with this, with the method illustrated in FIGS. 1A to 1D, the resist mask 32 is not removed and the row 62 is not again fixed to a new work base, and the resist mask 34 is formed overlapping the left resist mask 32. Therefore, a position misalignment to be caused by a warp of the row 62 can be suppressed. Even if there is a position misalignment, this is formed only by the resist mask 34. The final pattern of the rail 12 of the magnetic head 10 has, as shown in FIG. 7B, only a narrow area where a position misalignment is formed, and the floating performance is less affected. The top surface 14 has no position misalignment. The shallow surface (0.5 μm in depth) 20 and deep surface (2.5 μm in depth) 22 have a narrow area where a position misalignment is formed. The intermediate surface (2.0 μm in depth) 65 between the shallow and deep surfaces 20 and 22 is not formed.

According to this embodiment, the first resist mask 32 covering the area where none of the shallow and deep surfaces are formed is first formed to a sufficient thickness not to be removed by the first and second etching processes. Since this first resist mask 32 is used by both the first and second etching processes, it is not necessary to perform the processes ((4) and (5) in FIGS. 3A and 3B) of removing the first resist mask 32 after the first etching process and fixing the row again to another work base. Accordingly, a position misalignment of the second resist mask 34 is not likely to occur, and the first and second etching processes can be performed without mutual position misalignment, to thereby improve work precision of the rail and achieve the expected flying performance. It is also possible to prevent damages of the rail top surface and deformation of the slider to be otherwise caused by repetition of adhesion and dismount of the work base. Productivity can also be improved because it is not necessary to perform the process of removing the first resist mask 32 and fixing the row again to another work base after the first etching process.

Since the second resist mask 34 is formed overlapping the first resist mask 32 at their boarder portion, any space between the first and second resist masks 32 and 34 is not formed to be otherwise caused by the position misalignment of the resist masks.

The present invention has been described in connection with the preferred embodiments. The invention is not limited only to the above embodiments. It is apparent that various modifications, improvements, combinations, and the like can be made by those skilled in the art.

What is claimed is:

1. A method of manufacturing a slider having a rail, comprising the steps of:

a) providing a first mask pattern on a substrate having a primary surface of a first level;

b) etching the substrate through the first mask pattern to form a second level on the primary surface;

c) providing a second mask pattern on the substrate in such a manner that a part of the second mask pattern overlaps a part of the first mask pattern to form a third mask pattern; and d) etching the substrate through the third mask pattern to form a third level on the primary surface.

2. The method according to claim 1, further comprising the steps of:

e) removing the third mask pattern; and f) severing the substrate to provide the slider.

3. The method according to claim 1, wherein the steps b) and d) are performed with ion-milling.

4. The method according to claim 1, wherein the rail includes the first and second levels.

5. The method according to claim 1, wherein the second level is placed on an upstream side.

6. A method of manufacturing a slider having a rail, comprising the steps of:

a) forming magnetic transducers on a substrate in such a manner that the magnetic transducers are placed in rows;

b) severing the substrate into rows including plural magnetic transducers;

c) providing a first mask pattern to cover a first region in one of the rows having a primary surface;

d) etching the substrate through the first mask pattern;

e) providing a second mask pattern to cover a second region in the row in such a manner that a part of the second mask pattern overlaps a part of the first mask pattern to form a third mask pattern; and f) etching the substrate through the third mask pattern, wherein the first region corresponds to a first level on the primary surface and the second region corresponds to a second level on the primary surface.

7. The method according to claim 6, further comprising the steps of:

g) removing the third mask pattern; and h) severing the row to provide the slider.

8. The method according to claim 6, wherein the steps d) and f) are performed with ion-milling.

9. The method according to claim 6, wherein the rail is defined in the first and second regions.

10. The method according to claim 9, wherein the second level is placed on an upstream side.

11. A method of manufacturing a slider having a rail, comprising the steps of:

a) providing a row including magnetic transducers on a base;

b) providing a first mask pattern on the row;

c) etching the row through the first mask pattern, wherein the first mask pattern remains after the etching;

d) providing a second mask pattern on the row without removing the row from the base in such a manner that a part of the second mask pattern overlaps a part of the remaining first mask pattern to form a third mask pattern; and f) etching the substrate through the third mask pattern, wherein the first and second mask pattern remain after the etching.

12. The method according to claim 11, further comprising the steps of:

f) removing the third mask pattern; and g) severing the row to provide the slider.

13. The method according to claim 12, wherein the third mask pattern is removed in liquid solvent.

14. The method according to claim 11, wherein the steps c) and e) are performed with ion-milling.

* * * * *